Dec. 11, 1962  C. BELSKY  3,067,448
WINDSHIELD WIPER
Filed July 21, 1961  2 Sheets-Sheet 1

CHARLES BELSKY
INVENTOR.

BY

ATTORNEYS

Dec. 11, 1962 C. BELSKY 3,067,448
WINDSHIELD WIPER
Filed July 21, 1961 2 Sheets-Sheet 2
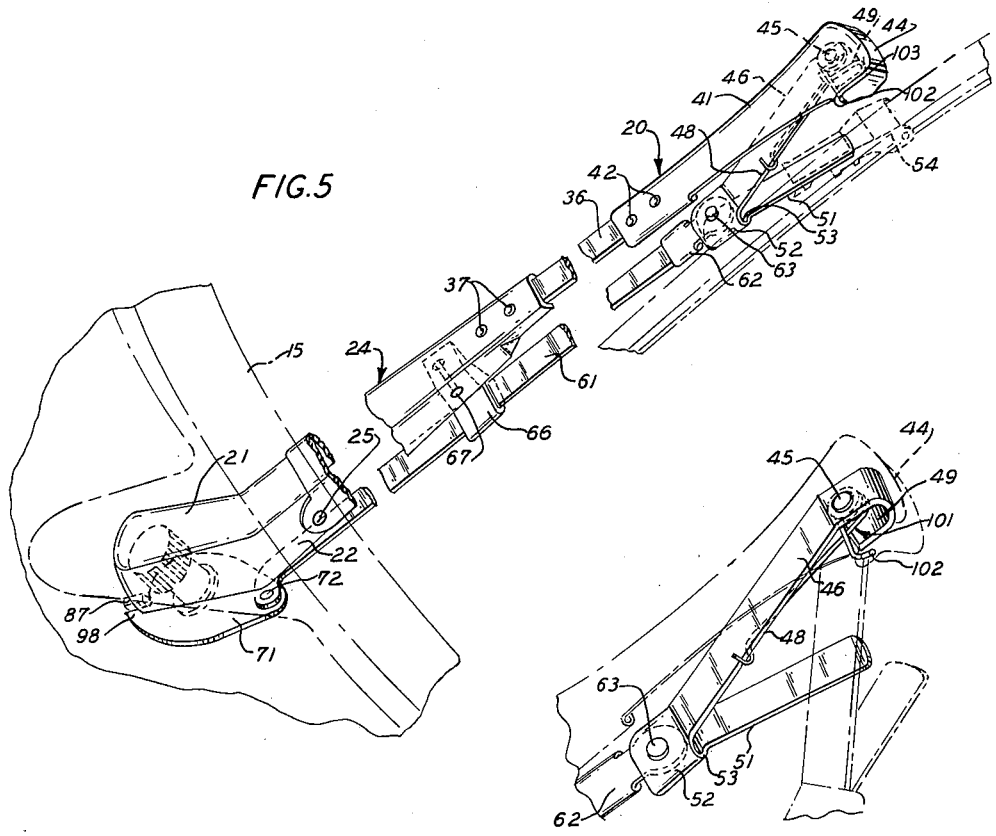
FIG.5
FIG.6
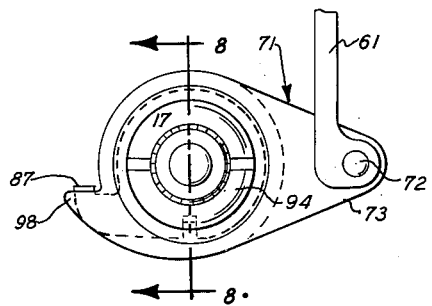
FIG.7
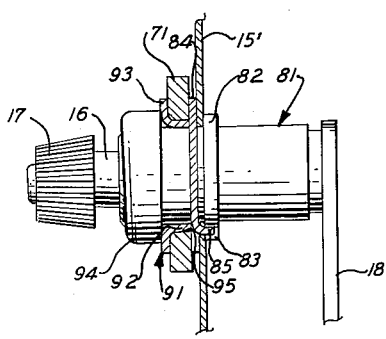
FIG.8
CHARLES BELSKY
INVENTOR.
BY John R. Faulkner
Keith Berschling
ATTORNEYS United States Patent Office 3,067,448
Patented Dec. 11, 1962

3,067,448
WINDSHIELD WIPER
Charles Belsky, Detroit, Mich., assignor to Ford Motor Company, Dearborn, Mich., a corporation of Delaware
Filed July 21, 1961, Ser. No. 125,728
3 Claims. (Cl. 15—250.23)

This invention relates to windshield wipers for motor vehicles and more particularly to a windshield wiper mechanism for driving a windshield wiper blade in a predetermined path.

Although not so limited the present invention is particularly well suited for improving and increasing the wiping pattern on modern day wrap around windshields.

In the preferred embodiment of the invention, the windshield wiper mechanism is provided with a first windshield wiper arm affixed to an oscillatable power driven pivot shaft. A freely rotatable actuating link is mounted about the shaft. A second windshield wiper arm is affixed to the actuating link and a windshield wiper blade is positioned in engagement with the windshield of the motor vehicle. The two windshield wiper arms and the windshield wiper blade are connected by connecting means that includes means to urge the first and second windshield wiper arms and the windshield wiper blade into alignment. This aligned position is maintained until a predetermined or selected position in the wiping pattern is reached by these three elements. At this time a pawl on the actuating link engages a stop means secured to the body of the vehicle thereby preventing further rotation of the actuating link. This angularly shifts the windshield wiper blade with respect to the windshield wiper arms upon further movement of the arms and the blade across the windshield.

When employed on a modern day automotive vehicle, including those having windshields that are curved in a horizontal direction at each side of the vehicle, the windshield wiper arms and the blade are maintained in substantial alignment from the inboard park position to a position where these three elements are substantially vertical. At this point the pawl on the actuating link contacts the stop means and upon further travel of the arms and the blade the windshield wiper blade is maintained in substantially a vertical position, or in a position substantially parallel to the position of the blade at the center of the wiping pattern. This increases and improves the wiping pattern of the blade over conventional windshield wiper systems now employed on automotive vehicles. It also minimizes the bending of the windshield wiper blade that is necessary to conform to the curvature of the windshield.

An object of the present invention is the provision of a windshield wiper mechanism that provides maximum coverage of the windshield.

A further object of the invention is the provision of a windshield wiper mechanism for an automotive vehicle that has an increased and improved wipe pattern.

Another object of the invention is the provision of a windshield wiper mechanism that will wipe a curved windshield with good efficiency.

Still another object of the invention is the provision of a windshield wiper mechanism for an automotive vehicle that accomplishes an improved and increased wipe pattern by means of an uncomplicated and positive acting mechanism that has relatively few parts in excess of conventional windshield wiper mechanisms.

Other objects and attendant advantages of the present invention will become more readily apparent as the specification is considered in connection with the attached drawings in which:

FIG. 5 is a perspective view of a portion of the windshield wiper mechanism with certain elements shown in phantom;

FIG. 6 is a view showing the connection between the two windshield wiper arms as it appears in two different positions;

FIG. 7 is a plan view of the actuating mechanism of the present invention, and

FIG. 8 is a sectional view, with portions in elevation, taken along the lines 8—8 of FIG. 7.

Figure 1:
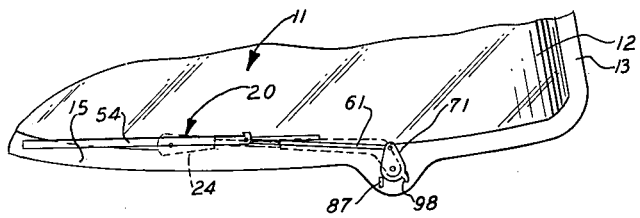
FIG. 1 is a semidiagrammatical front elevational view of the windshield and windshield wiper mechanism embodying the present invention, with the windshield wiper mechanism positioned in the park position.
Figure 2:
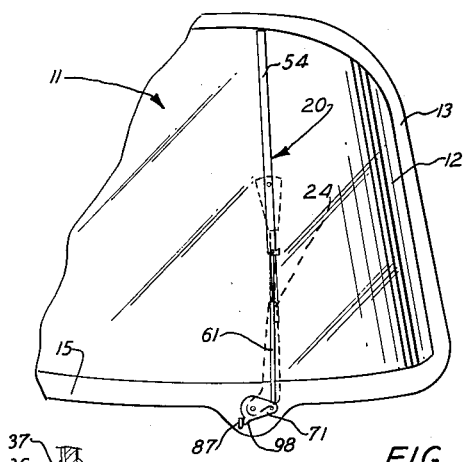
FIG. 2 is a view similar to FIG. 1 but with the windshield wiper mechanism positioned in a substantially vertical position.
Figure 3:
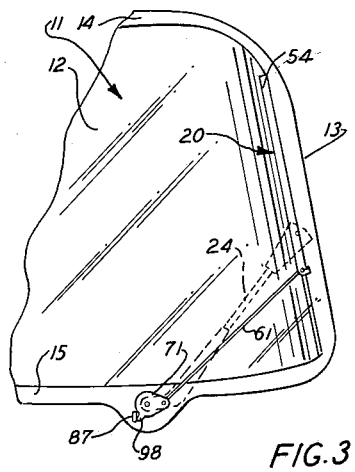
FIG. 3 is a view similar to FIGS. 1 and 2 but with the windshield wiper mechanism positioned at the end of the wipe pattern, and adjacent the windshield pillar.

Referring now to the drawings in which like reference numerals designate like parts throughout the several views thereof, there is shown in FIGS. 1 through 3 a windshield 11 of a modern day automotive vehicle. This windshield may have sides which wrap around in a horizontal direction, as designated by the numeral 12. It may be supported in the motor vehicle by means of side pillars 13, header 14 and cowl 15. The windshield wiper mechanism of the present invention is particularly well suited for wiping this type of windshield.

Figure 4:
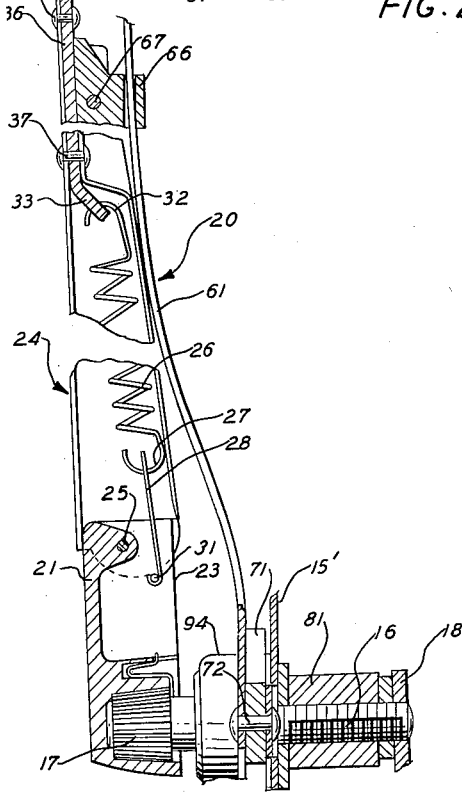
FIG. 4 is a sectional view of a portion of the windshield wiper mechanism of the present invention.

Referring now to FIGS. 4 through 8, with particular reference to FIGS. 4 and 8, the cowl 15 includes a cowl panel 15', shown in cross-section. An oscillatable power driven pivot shaft 16 extends through an aperture in the cowl panel and it has a drum head 17 positioned at one end and a power driven actuating crank 18 positioned at the other end. This crank may be driven by any suitable power source, for example, by an electric motor (not shown). The drum head 17 is splined or serrated for connection to a head 21 of the windshield wiper mechanism, generally designated by the numeral 20. The head 21 has a pair of depending legs 22 one of which is shown in FIG. 5 and the other of which is shown at 23 in FIG. 4. Thus, the head 21 has a generally U-shaped upper section, and this U-shaped upper section is pivotally connected to a first windshield wiper arm 24, which may also be U-shaped, by means of a pivot pin 25.

A spring member, generally designated by the numeral 26, is employed to bias the windshield wiper arm 24 toward the windshield in a direction substantially perpendicular to the direction of movement of the wiper arm as it traverses the windshield. This spring has a first U-shaped end 27 that engages one end of a link 28, while the other end of the link is connected to a pin 31 supported by the head 21. The spring 27 has a second U-shaped end 32 connected to a bracket 33 that is suitably connected to the arm 24 as will be explained subsequently. It is readily apparent that the line of action of the spring member 26 lies between the windshield and the pivot 25 that connects the head 21 and the arm 24, therefore, the spring 26 continually biases the arm 24 toward the windshield.

The arm 24 has an extension in the form of a strap member 36. This strap member is formed integrally with the bracket 33 and is riveted to the arm 24 as shown at 37. Referring now particularly to FIG. 5, the strap member 36 has an end member 41 riveted thereto as shown at 42. The end member 41 has a head portion 44 that supports a depending pivot pin 45. This pivot pin is affixed to the head portion 44 and to a link 46 in such a manner that pivotal motion is permitted between the head 44 and the link 46. The link 46 is generally V-shaped in configuration and includes a first leg 48 that terminates in a U-shaped end portion 49, and a second leg 51 that merges with the first leg at 52 into a socket, generally designated by the numeral 53. The leg 51 is connected to a windshield wiper blade mechanism 54 in a conventional fashion. The windshield wiper blade mechanism 54 is a conventional mechanism and, of course, carries a flexible wiper blade portion that engages the windshield 11 of the automotive vehicle.

A second windshield wiper arm, generally designated by the numeral 61, includes an end portion 62 that is received within the socket 53, and is pivotally connected to the end portion 52 of the link 46 by means of a pivot pin 63. The arm 61 extends through a slotted guide member 66 that is affixed to the first windshield wiper arm 24 by any suitable means, for example, by a pin 67. This slot is of sufficient width to permit the shifting of the first and the second arms relative to one another as shown in FIG. 3. The other end of the second arm 61 is pivotally attached to an actuating link 71 by means of a pivot pin 72, preferably towards the end of an arm member 73. Thus, the second arm is located adjacent the first arm and on the side of the first arm toward the windshield.

The means for mounting the oscillatable power driven pivot shaft and the actuating link 71 will now be described in relation to FIGS. 4, 7 and 8. The shaft 16 is mounted in a bushing 81 having a shoulder 82 abutting the under side of the cowl panel 15'. This shoulder has a slot 83 positioned therein. A locating plate 84 is positioned against the other side, or upper side, of the cowl panel 15'. This locating plate has a depending tab 85 which extends from the plane of the plate in substantially a perpendicular direction and is positioned within the slot 83. The slot 83 and the tab 85 have substantially the same dimensions so that the locating plate 84 cannot rotate relative to the bushing 81. The locating plate also has an upstanding ear 87 which also extends in a substantially perpendicular direction from the plane of the plate and from the plane of the cowl panel.

A spacer 91 is positioned around the bushing 81 and has an axially extending body portion 92 engaging the locating plate 84 and a radially extending flange 93 that engages a slotted fastening nut 94 that is threaded onto the bushing 81. The actuating link 71 has an aperture positioned therein, designated by the numeral 95, which engages the spacer in a loose fit relationship circumferentially. The spacer is dimensioned axially so that in an axial direction there is a loose fit relationship between the radial flange 93 of the spacer, the actuating link 71 and the locating plate 84. These loose fit relationships are such as to permit the actuating link 71 to rotate freely on the spacer. It can readily be appreciated that the bushing 81 is clamped to the cowl panel by means of shoulder 82, locating plate 84, spacer 91 and nut 94. The actuating link 71 also includes a radially extending pawl 98 that is adapted to engage the upstanding ear 87 on the locating plate when the windshield wiper mechanism has reached the position shown in FIG. 2.

As can best be seen by reference to FIGS. 1 and 2, the windshield wiper blade, the first windshield wiper arm 24 and the second windshield wiper arm 61, are maintained in substantial alignment from the "park" position shown in FIG. 1 to the position in which the windshield wiper blade is in a substantial vertical position, as shown in FIG. 2. This is accomplished by means of a torsion spring which can be seen by reference to FIGS. 5 and 6 and which is designated generally by the numeral 101. It is wrapped around the pivot pin 45 and has a first end 102 protruding through an aperture 103 positioned in end member 41. The other end of the spring 104 engages the leg 48 of link member 46.

Thus, during the movement from the position shown in FIG. 1 to the position shown in FIG. 2 the torsion spring biases the windshield wiper blade and the two windshield wiper arms into substantial alignment, and the actuating link 71 is permitted to rotate freely about the spacer 91 and the bushing 81. When the windshield wiper blade reaches the position shown in FIG. 2, the pawl 98 on the actuating link 71 engages the upstanding ear or stop means 87. This prevents further rotation of the actuating link and the end of the rod 61 that is attached to the actuating link remains in a stationary position, as the windshield wiper blade moves from the position shown in FIG. 2 to the position shown in FIG. 3. This prevents the end of the arm 61 which is attached to actuating link 71 from moving in a path concentric to shaft 16 which it followed during the movement of the windshield wiper mechanism from the position shown in FIG. 1 to the position shown in FIG. 2. As a result, the windshield wiper blade is shifted angularly with respect to the arms 61 and 24 as it completes its travel across the windshield to a position adjacent the pillar 13. The movement of the link 46 relative to the end member 41 of the first arm 24 can be seen by reference to FIG. 6 in which the position of the actuating link 48 is shown in solid lines when the windshield wiper mechanism is in the position shown in FIGS. 1 and 2 and is shown in dotted lines when the windshield wiper mechanism is positioned in the position shown in FIG. 3.

Thus, the windshield wiper blade is maintained in a position substantially parallel to the position in which it finds itself as it approaches the vertical portion of its sweep. This permits it to wipe a substantially greater portion of the windshield than is accomplished by conventional windshield wiper mechanisms in which the windshield wiper arm and blade are maintained in substantial alignment throughout the wiping pattern. Also, the windshield wiper blade is maintained in a position substantially perpendicular to the curvature of the side of the windshield 12 and thus the blade need not bend around this curvature to a degree necessary with a conventional windshield wiper mechanism.

It can readily be appreciated by inspection of the drawings and a reading of the specification that the mechanism provided for increasing the windshield wiper pattern is an uncomplicated mechanism that is positive in its operation. Thus, the present invention provides a reliable and inexpensive means for increasing the wipe pattern of a windshield wiper mechanism that is particularly adapted to be employed with modern day horizontal wrap around type windshields.

It will be understood that the invention is not to be limited to the exact construction shown and described, but that various changes and modifications may be made without departing from the spirit and scope of the invention as defined in the appended claims.

I claim:

1. A windshield wiper mechanism for cleaning the windshield of an automotive vehicle body comprising, an oscillatable shaft, means for mounting said oscillatable shaft in the body adjacent the windshield, a first windshield wiper arm affixed to said oscillatable shaft, an actuating link positioned around said oscillatable shaft and said means and being freely rotatable with respect to said means, a second windshield wiper arm affixed to said actuating link, a windshield wiper blade adapted to be positioned in engagement with the windshield, said second windshield wiper arm being affixed to said windshield wiper blade, means interconnecting the ends of said first and said second windshield wiper arms adjacent said windshield wiper blade including spring means for urging said first and said second windshield wiper arms and said windshield wiper blade into substantial alignment, stop means adapted to be mounted on the body adjacent said actuating link, and means on said actuating link for engaging said stop means when the windshield wiper blade has reached a selected position in its travel toward the side of the windshield and for preventing said actuating link and affixed second windshield wiper arm from rotating in alignment with said first windshield wiper arm whereby said windshield wiper blade is shifted angularly with respect to said first and said second windshield wiper arms.

2. A windshield wiper mechanism for cleaning the windshield of an automotive vehicle body comprising a bushing adapted to be positioned in an aperture in the body adjacent the windshield, a power driven oscillatable shaft mounted in said bushing, a first windshield wiper arm affixed to said power driven oscillatable shaft, said bushing having a shoulder adapted to engage the body around said aperture, a locating plate positioned around said bushing and adapted to engage the other side of said body, said locating plate having an upstanding ear and means engaging the bushing for preventing angular movement of said locating plate relative to said bushing, an actuating link positioned over said locating plate and around said bushing in a loose fit relationship so as to be freely rotatable with respect to said bushing, said actuating link having a radially extending pawl, a second windshield wiper arm pivotally secured to said actuating link, a windshield wiper blade adapted to be positioned in contact with the windshield and affixed to said second windshield wiper arm, means interconnecting the ends of said first and said second windshield wiper arms adjacent said windshield wiper blade including spring means for urging said first and said second windshield wiper arms and said windshield wiper blade into substantial alignment, said pawl on said actuating link engaging the upstanding ear on said locating plate when the windshield wiper blade has reached a selected position in its travel to shift the windshield wiper blade angularly with respect to one of said windshield wiper arms.

3. A windshield wiper mechanism for cleaning the windshield of an automotive vehicle comprising a bushing adapted to be positioned in an aperture in a cowl panel adjacent the windshield, an oscillatable shaft mounted in said bushing, a first windshield wiper arm affixed to said oscillatable shaft, said bushing having a shoulder adapted to engage the cowl panel around said aperture, said shoulder having a slot positioned therein, a locating plate positioned around said bushing and adapted to engage the other side of said cowl panel, said locating plate having an upstanding ear and a depending tab, said depending tab engaging the slot in the shoulder to prevent angular movement of said locating plate relative to said bushing, an actuating link positioned over said locating plate and around said bushing, a spacer having a main portion extending in a direction parallel to the axis of said oscillatable shaft and a radially outwardly extending flange, said spacer being positioned around said bushing with the main body portion extending between said bushing and said actuating link and with the end of said body portion engaging said locating plate, and fastening means engaging said bushing and said spacer adapted to secure said bushing and said actuating plate to the cowl panel, said spacer being so dimensioned as to permit said actuating link to rotate freely with respect to said bushing, said actuating link having a radially extending pawl on one side and a radially extending arm on the other side, a second windshield wiper arm pivotally secured to the arm of said actuating link, a windshield wiper blade adapted to be positioned in contact with the windshield and affixed to said second windshield wiper arm, means interconnecting the ends of said first and said second windshield wiper arms adjacent said windshield wiper blade including spring means for urging said first and said second windshield wiper arms and said windshield wiper blade into substantial alignment, said pawl on said actuating link engaging the upstanding ear on said locating plate when the windshield wiper blade has reached a selected position in its travel to shift the windshield wiper blade angularly with respect to said first and said second windshield wiper arms.

References Cited in the file of this patent
UNITED STATES PATENTS 2,871,501    Wernig _____ Feb. 3, 1959